United States Patent
Chou

(10) Patent No.: US 10,622,828 B2
(45) Date of Patent: Apr. 14, 2020

(54) INTELLIGENT WIRELESS POWER-SUPPLYING MOUSE PAD

(71) Applicant: Hades-Gaming Corporation, New Taipei (TW)

(72) Inventor: Hung-Jen Chou, New Taipei (TW)

(73) Assignee: HADES-GAMING CORPORATION, New Taipei (TW)

( * ) Notice: Subject to any disclaimer, the term of this patent is extended or adjusted under 35 U.S.C. 154(b) by 40 days.

(21) Appl. No.: 16/017,199

(22) Filed: Jun. 25, 2018

(65) Prior Publication Data

US 2019/0393711 A1   Dec. 26, 2019

(51) Int. Cl.
| | |
|---|---|
| *H02J 7/00* | (2006.01) |
| *H02J 7/02* | (2016.01) |
| *G06F 3/039* | (2013.01) |
| *H02J 50/10* | (2016.01) |
| *G06F 3/0354* | (2013.01) |
| *H02J 50/40* | (2016.01) |

(52) U.S. Cl.
CPC ............ *H02J 7/025* (2013.01); *G06F 3/0395* (2013.01); *G06F 3/03543* (2013.01); *H02J 7/027* (2013.01); *H02J 50/10* (2016.02); *H02J 50/40* (2016.02)

(58) Field of Classification Search
USPC ........................................................ 320/108
See application file for complete search history.

(56) References Cited

U.S. PATENT DOCUMENTS

| | | | | |
|---|---|---|---|---|
| 9,425,643 B2* | 8/2016 | Huang | ..................... | H02J 7/025 |
| 2004/0189246 A1* | 9/2004 | Bulai | ................... | G06F 3/03543 |
| | | | | 320/108 |
| 2008/0211455 A1* | 9/2008 | Park | ........................ | H02J 7/025 |
| | | | | 320/108 |
| 2012/0206090 A1* | 8/2012 | Hyun-Jun | ............... | H02J 50/10 |
| | | | | 320/107 |
| 2014/0247004 A1* | 9/2014 | Kari | ........................ | H02J 5/005 |
| | | | | 320/106 |
| 2014/0266025 A1* | 9/2014 | Jakubowski | ............ | H02J 5/005 |
| | | | | 320/108 |
| 2015/0042267 A1* | 2/2015 | Wang | .................... | H02J 7/0052 |
| | | | | 320/108 |

(Continued)

*Primary Examiner* — Samuel Berhanu
(74) *Attorney, Agent, or Firm* — Muncy, Geissler, Olds & Lowe, P.C.

(57) ABSTRACT

An intelligent wireless power-supplying mouse pad is applied to a wirelessly-charged mouse. The intelligent wireless power-supplying mouse pad includes a mouse pad body, a plurality of inductive charging units and a control unit. Each of the inductive charging units includes an inductive charging coil and an inductive charging loop. When the inductive charging coil and the wirelessly-charged mouse form an inductive coupling to perform a wireless charging to the wirelessly-charged mouse, the inductive charging loop detects a charging current of the inductive charging coil to obtain a charging status signal. The inductive charging loop sends the charging status signal to the control unit. Based on the charging status signal, the control unit controls a magnitude of an output energy outputted from the inductive charging loop to the inductive charging coil to control an emitting power of the inductive charging coil.

5 Claims, 6 Drawing Sheets

(56) References Cited

U.S. PATENT DOCUMENTS

| | | | |
|---|---|---|---|
| 2016/0085322 A1* | 3/2016 | Park | G06F 1/266 |
| | | | 345/163 |
| 2016/0165019 A1* | 6/2016 | Yang | H04W 4/80 |
| | | | 455/557 |
| 2016/0246265 A1* | 8/2016 | An | G05B 1/01 |
| 2017/0040810 A1* | 2/2017 | Hu | H02J 7/0036 |
| 2018/0269561 A1* | 9/2018 | Kim | H01Q 1/48 |

\* cited by examiner

INTELLIGENT WIRELESS POWER-SUPPLYING MOUSE PAD

BACKGROUND OF THE INVENTION

Field of the Invention

The present invention relates to a wireless power-supplying mouse pad, and especially relates to an intelligent wireless power-supplying mouse pad.

Description of the Related Art

A mouse is a common electronic apparatus which is usually connected to a computer or a notebook computer to control a cursor displayed on a monitor. Therefore, the mouse is a very convenient and important electronic apparatus. In order to use the mouse more smoothly, the mouse is usually used on a mouse pad, so that the mouse pad is almost necessary for the mouse. The mouse needs power to work. Afterwards, a related art wireless power-supplying mouse pad is provided to wirelessly supply power to a wirelessly-charged mouse. The related art wireless power-supplying mouse pad is very convenient for a user. The user does not need to worry about an electric power source for the wirelessly-charged mouse.

However, a disadvantage of the related art wireless power-supplying mouse pad is that the overall related art wireless power-supplying mouse pad always works. This is unnecessary and wastes energy for some parts which are of the related art wireless power-supplying mouse pad and which are not near the wirelessly-charged mouse. For example, if the wirelessly-charged mouse is arranged on a left-most part of the related art wireless power-supplying mouse pad, a right-most part of the related art wireless power-supplying mouse pad working with the same energy is unnecessary and wastes energy.

SUMMARY OF THE INVENTION

In order to solve the above-mentioned problems, an object of the present invention is to provide an intelligent wireless power-supplying mouse pad.

In order to achieve the object of the present invention mentioned above, the intelligent wireless power-supplying mouse pad of the present invention is applied to a wirelessly-charged mouse. The intelligent wireless power-supplying mouse pad comprises a mouse pad body, a plurality of inductive charging units and a control unit. The inductive charging units are arranged in the mouse pad body. The control unit is electrically connected to the inductive charging units. The control unit is arranged in the mouse pad body. Moreover, each of the inductive charging units comprises an inductive charging coil and an inductive charging loop. The inductive charging loop is electrically connected to the inductive charging coil and the control unit. Moreover, when the inductive charging coil and the wirelessly-charged mouse are configured to form an inductive coupling to perform a wireless charging to the wirelessly-charged mouse, the inductive charging loop is configured to detect a charging current of the inductive charging coil to obtain a charging status signal. The inductive charging loop is configured to send the charging status signal to the control unit. Based on the charging status signal, the control unit is configured to control a magnitude of an output energy outputted from the inductive charging loop to the inductive charging coil to control an emitting power of the inductive charging coil.

Moreover, in an embodiment of the present invention, for the intelligent wireless power-supplying mouse pad mentioned above, the inductive charging loop comprises a current-detecting unit electrically connected to the inductive charging coil and the control unit. Moreover, when the inductive charging coil and the wirelessly-charged mouse are configured to form the inductive coupling to perform the wireless charging to the wirelessly-charged mouse, the current-detecting unit of the inductive charging loop is configured to detect the charging current of the inductive charging coil to obtain the charging status signal.

Moreover, in an embodiment of the present invention, the intelligent wireless power-supplying mouse pad mentioned above further comprises a charged battery electrically connected to the control unit and the inductive charging units. Moreover, the charged battery is configured to supply power to the control unit and the inductive charging units.

Moreover, in an embodiment of the present invention, the intelligent wireless power-supplying mouse pad mentioned above further comprises a power-converting unit and a power connection port. The power-converting unit is electrically connected to the control unit and the inductive charging units. The power connection port is electrically connected to the power-converting unit. Moreover, the power-converting unit is configured to supply power to the control unit and the inductive charging units.

Moreover, in an embodiment of the present invention, the intelligent wireless power-supplying mouse pad mentioned above further comprises a charge-indicating light-emitting diode electrically connected to the control unit. Moreover, when the inductive charging coil and the wirelessly-charged mouse are configured to form the inductive coupling to perform the wireless charging to the wirelessly-charged mouse, the control unit is configured to drive the charge-indicating light-emitting diode to light based on the charging status signal.

The advantage of the present invention is to save the energy of the wireless power-supplying mouse pad.

Please refer to the detailed descriptions and figures of the present invention mentioned below for further understanding the technology, method and effect of the present invention. The figures are only for references and descriptions, and the present invention is not limited by the figures.

DETAILED DESCRIPTION OF THE INVENTION

Figure 1:
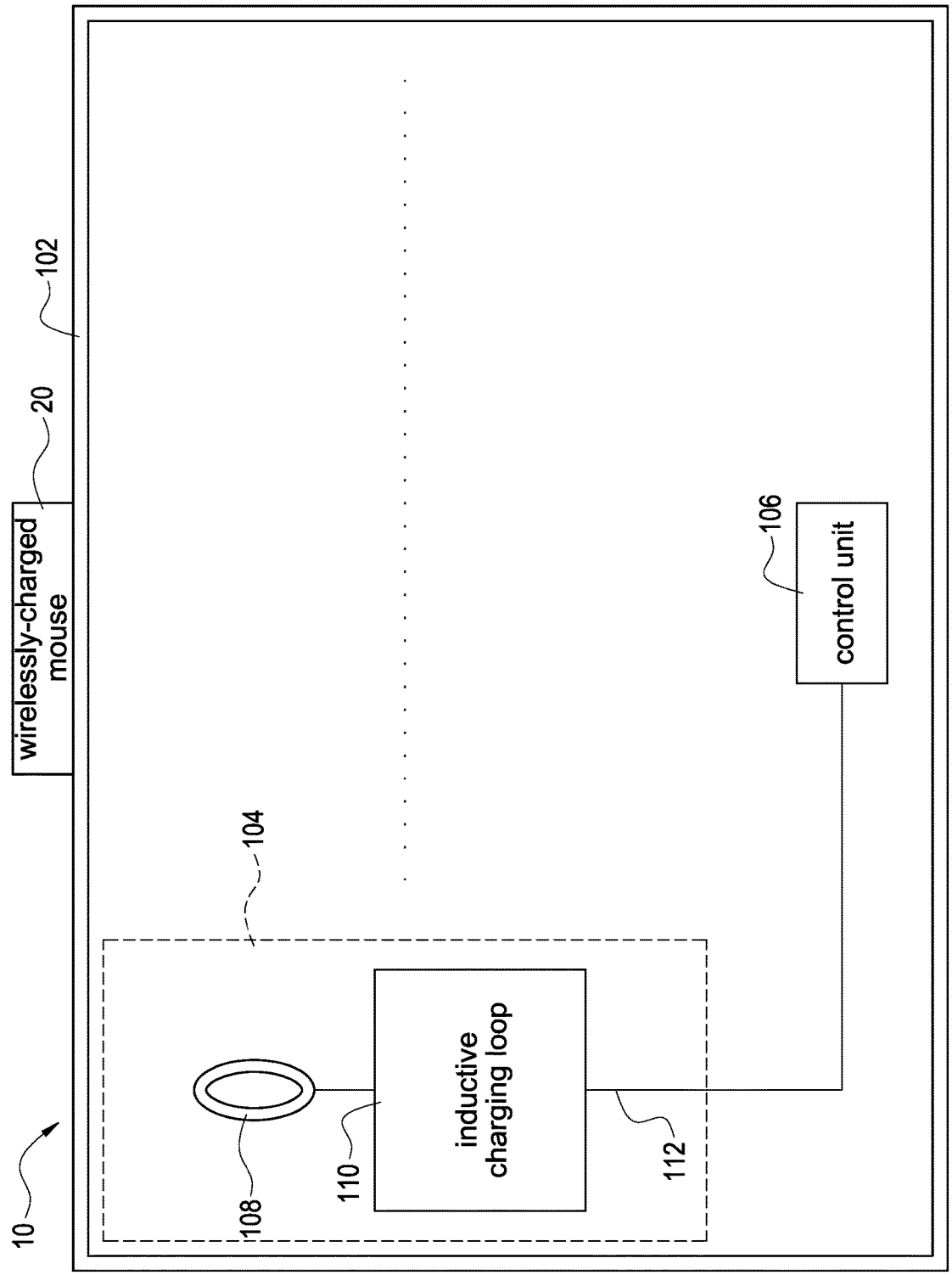
FIG. 1 shows a circuit block diagram of the first embodiment of the intelligent wireless power-supplying mouse pad of the present invention.
Figure 2:
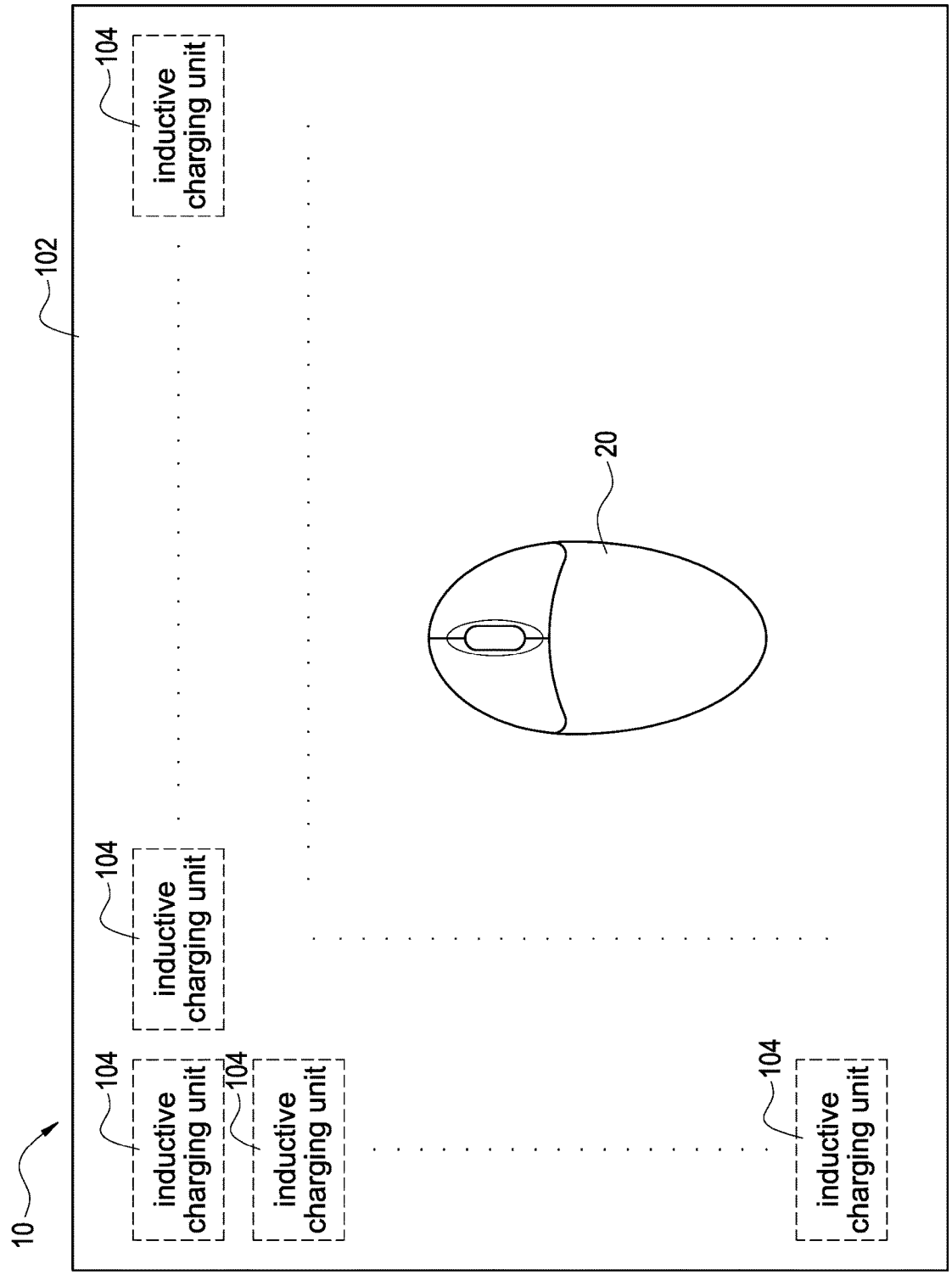
FIG. 2 shows a top view of the intelligent wireless power-supplying mouse pad of the present invention.

In the present disclosure, numerous specific details are provided, to provide a thorough understanding of embodiments of the invention. Persons of ordinary skill in the art will recognize, however, that the present invention can be practiced without one or more of the specific details. In other instances, well-known details are not shown or described to avoid obscuring aspects of the present invention. Please refer to following detailed description and figures for the technical content of the present invention:

FIG. 1 shows a circuit block diagram of the first embodiment of the intelligent wireless power-supplying mouse pad of the present invention. FIG. 2 shows a top view of the intelligent wireless power-supplying mouse pad of the present invention. An intelligent wireless power-supplying mouse pad 10 of the present invention is applied to a wirelessly-charged mouse 20. The intelligent wireless power-supplying mouse pad 10 comprises a mouse pad body 102, a plurality of inductive charging units 104 and a control unit 106. Each of the inductive charging units 104 comprises an inductive charging coil 108 and an inductive charging loop 110. The inductive charging units 104 are arranged in the mouse pad body 102. The control unit 106 is electrically connected to the inductive charging units 104. The control unit 106 is arranged in the mouse pad body 102. The inductive charging loop 110 is electrically connected to the inductive charging coil 108 and the control unit 106. The wirelessly-charged mouse 20 comprises an induction coil (not shown in FIG. 1), an alternating-current-to-direct-current conversion circuit (not shown in FIG. 1), an electricity storage unit (not shown in FIG. 1), and so on, to achieve wirelessly receiving energy, converting energy and storing energy. The wirelessly-charged mouse 20 is used on the mouse pad body 102 to control a cursor (not shown in FIG. 1) displayed on a monitor (not shown in FIG. 1) of a computer (not shown in FIG. 1) or a notebook computer (not shown in FIG. 1).

When the inductive charging coil 108 and the wirelessly-charged mouse 20 are configured to form an inductive coupling to perform a wireless charging to the wirelessly-charged mouse 20, the inductive charging loop 110 is configured to detect a charging current of the inductive charging coil 108 to obtain a charging status signal 112. The inductive charging loop 110 is configured to send the charging status signal 112 to the control unit 106. Based on the charging status signal 112, the control unit 106 is configured to control a magnitude of an output energy outputted from the inductive charging loop 110 to the inductive charging coil 108 to control an emitting power of the inductive charging coil 108.

Moreover, when the control unit 106 is configured to determine that the charging status signals 112 obtained by detecting the charging currents of a first quantity of the inductive charging coils 108 of the inductive charging units 104 are less than a charging predetermined value respectively (which means the wireless charging is not performed completely), the control unit 106 is configured to correspondingly control the magnitudes of the output energies outputted from the inductive charging loops 110 to the first quantity of the inductive charging coils 108 of the inductive charging units 104 as a first energy value respectively. When the control unit 106 is configured to determine that the charging status signals 112 obtained by detecting the charging currents of a second quantity of the inductive charging coils 108 of the inductive charging units 104 are greater than or equal to the charging predetermined value respectively, the control unit 106 is configured to correspondingly control the magnitudes of the output energies outputted from the inductive charging loops 110 to the second quantity of the inductive charging coils 108 of the inductive charging units 104 as a second energy value respectively. The first quantity is greater than zero. The second quantity is greater than zero. The first quantity and the second quantity are a total quantity of the inductive charging units 104. The second energy value is greater than the first energy value. The first energy value is greater than or equal to zero.

For example, the total quantity of the inductive charging units 104 is 100. There are 84 of the inductive charging units 104 not near the wirelessly-charged mouse 20, so that 84 of the charging status signals 112 obtained by detecting 84 of the charging currents of 84 of the inductive charging coils 108 of 84 of the inductive charging units 104 are less than the charging predetermined value respectively, and the control unit 106 is configured to correspondingly control the magnitudes of 84 of the output energies outputted from 84 of the inductive charging loops 110 to 84 of the inductive charging coils 108 of 84 of the inductive charging units 104 as the first energy value respectively. There are 16 of the inductive charging units 104 near the wirelessly-charged mouse 20, so that 16 of the charging status signals 112 obtained by detecting 16 of the charging currents of 16 of the inductive charging coils 108 of 16 of the inductive charging units 104 are greater than or equal to the charging predetermined value respectively, and the control unit 106 is configured to correspondingly control the magnitudes of 16 of the output energies outputted from 16 of the inductive charging loops 110 to 16 of the inductive charging coils 108 of 16 of the inductive charging units 104 as the second energy value respectively. The first quantity is 84. The second quantity is 16.

The charging status signals 112 obtained by detecting the charging currents of the inductive charging coils 108 of the inductive charging units 104 not near the wirelessly-charged mouse 20 are weaker (namely, less than the charging predetermined value), so that the control unit 106 is configured to control the magnitudes of the output energies outputted from the inductive charging loops 110 to the inductive charging coils 108 of the inductive charging units 104 not near the wirelessly-charged mouse 20 as the first energy value respectively. Therefore, the purpose of saving energy of the present invention is achieved.

The charging status signals 112 obtained by detecting the charging currents of the inductive charging coils 108 of the inductive charging units 104 near the wirelessly-charged mouse 20 are stronger (namely, greater than or equal to the charging predetermined value), so that the control unit 106 is configured to control the magnitudes of the output energies outputted from the inductive charging loops 110 to the inductive charging coils 108 of the inductive charging units 104 near the wirelessly-charged mouse 20 as the second energy value respectively.

As the wirelessly-charged mouse 20 moves on the mouse pad body 102, locations of the inductive charging units 104 near the wirelessly-charged mouse 20 will be changed accordingly. The present invention can detect movements of the wirelessly-charged mouse 20, so that the magnitudes of the output energies outputted from the inductive charging loops 110 to the inductive charging coils 108 of the inductive charging units 104 near the wirelessly-charged mouse 20 are stronger. The magnitudes of the output energies outputted from the inductive charging loops 110 to the inductive charging coils 108 of the inductive charging units 104 not near the wirelessly-charged mouse 20 are weaker. Therefore, the purpose of saving energy of the present invention is achieved.

Moreover, in order to avoid the charging status signal 112 continually through the charging predetermined value, the present invention has similar hysteresis effect for the charging status signal 112, which is described below:

When the control unit 106 is configured to determine that the charging status signals 112 obtained by detecting the charging currents of a first quantity of the inductive charging coils 108 of the inductive charging units 104 are less than a first hysteresis value respectively (which means the wireless charging is not performed completely), the control unit 106 is configured to correspondingly control the magnitudes of the output energies outputted from the inductive charging loops 110 to the first quantity of the inductive charging coils 108 of the inductive charging units 104 as a first energy value respectively.

When the control unit 106 is configured to determine that the charging status signals 112 obtained by detecting the charging currents of a second quantity of the inductive charging coils 108 of the inductive charging units 104 are greater than a second hysteresis value respectively, the control unit 106 is configured to correspondingly control the magnitudes of the output energies outputted from the inductive charging loops 110 to the second quantity of the inductive charging coils 108 of the inductive charging units 104 as a second energy value respectively.

When the control unit 106 is configured to determine that the charging status signals 112 obtained by detecting the charging currents of a third quantity of the inductive charging coils 108 of the inductive charging units 104 are between the first hysteresis value and the second hysteresis value respectively and the charging status signals 112 are less than the first hysteresis value before being between the first hysteresis value and the second hysteresis value, the control unit 106 is configured to correspondingly control the magnitudes of the output energies outputted from the inductive charging loops 110 to the third quantity of the inductive charging coils 108 of the inductive charging units 104 as the first energy value respectively.

When the control unit 106 is configured to determine that the charging status signals 112 obtained by detecting the charging currents of a fourth quantity of the inductive charging coils 108 of the inductive charging units 104 are between the first hysteresis value and the second hysteresis value respectively and the charging status signals 112 are greater than the second hysteresis value before being between the first hysteresis value and the second hysteresis value, the control unit 106 is configured to correspondingly control the magnitudes of the output energies outputted from the inductive charging loops 110 to the fourth quantity of the inductive charging coils 108 of the inductive charging units 104 as the second energy value respectively.

The first quantity is greater than zero. The second quantity is greater than zero. The third quantity is greater than zero. The fourth quantity is greater than zero. The first quantity, the second quantity, the third quantity and the fourth quantity are a total quantity of the inductive charging units 104. The second hysteresis value is greater than the first hysteresis value. The first hysteresis value is greater than zero. The second energy value is greater than the first energy value. The first energy value is greater than or equal to zero.

For example, when the control unit 106 is configured to determine that 64 of the charging status signals 112 obtained by detecting 64 of the charging currents of 64 of the inductive charging coils 108 of 64 of the inductive charging units 104 are less than the first hysteresis respectively, the control unit 106 is configured to correspondingly control the magnitudes of 64 of the output energies outputted from 64 of the inductive charging loops 110 to 64 of the inductive charging coils 108 of 64 of the inductive charging units 104 as the first energy value respectively.

When the control unit 106 is configured to determine that 16 of the charging status signals 112 obtained by detecting 16 of the charging currents of 16 of the inductive charging coils 108 of 16 of the inductive charging units 104 are greater than the second hysteresis respectively, the control unit 106 is configured to correspondingly control the magnitudes of 16 of the output energies outputted from 16 of the inductive charging loops 110 to 16 of the inductive charging coils 108 of 16 of the inductive charging units 104 as the second energy value respectively.

When the control unit 106 is configured to determine that 11 of the charging status signals 112 obtained by detecting 11 of the charging currents of 11 of the inductive charging coils 108 of 11 of the inductive charging units 104 are between the first hysteresis value and the second hysteresis value respectively and 11 of the charging status signals 112 are less than the first hysteresis value before being between the first hysteresis value and the second hysteresis value, the control unit 106 is configured to correspondingly control the magnitudes of 11 of the output energies outputted from 11 of the inductive charging loops 110 to 11 of the inductive charging coils 108 of 11 of the inductive charging units 104 as the first energy value respectively.

When the control unit 106 is configured to determine that 9 of the charging status signals 112 obtained by detecting 9 of the charging currents of 9 of the inductive charging coils 108 of 9 of the inductive charging units 104 are between the first hysteresis value and the second hysteresis value respectively and 9 of the charging status signals 112 are greater than the second hysteresis value before being between the first hysteresis value and the second hysteresis value, the control unit 106 is configured to correspondingly control the magnitudes of 9 of the output energies outputted from 9 of the inductive charging loops 110 to 9 of the inductive charging coils 108 of 9 of the inductive charging units 104 as the second energy value respectively.

In the embodiment mentioned above, the first quantity is 64, the second quantity is 16, the third quantity is 11, the fourth quantity is 9, and the total quantity of the inductive charging units 104 is 100.

Figure 3:
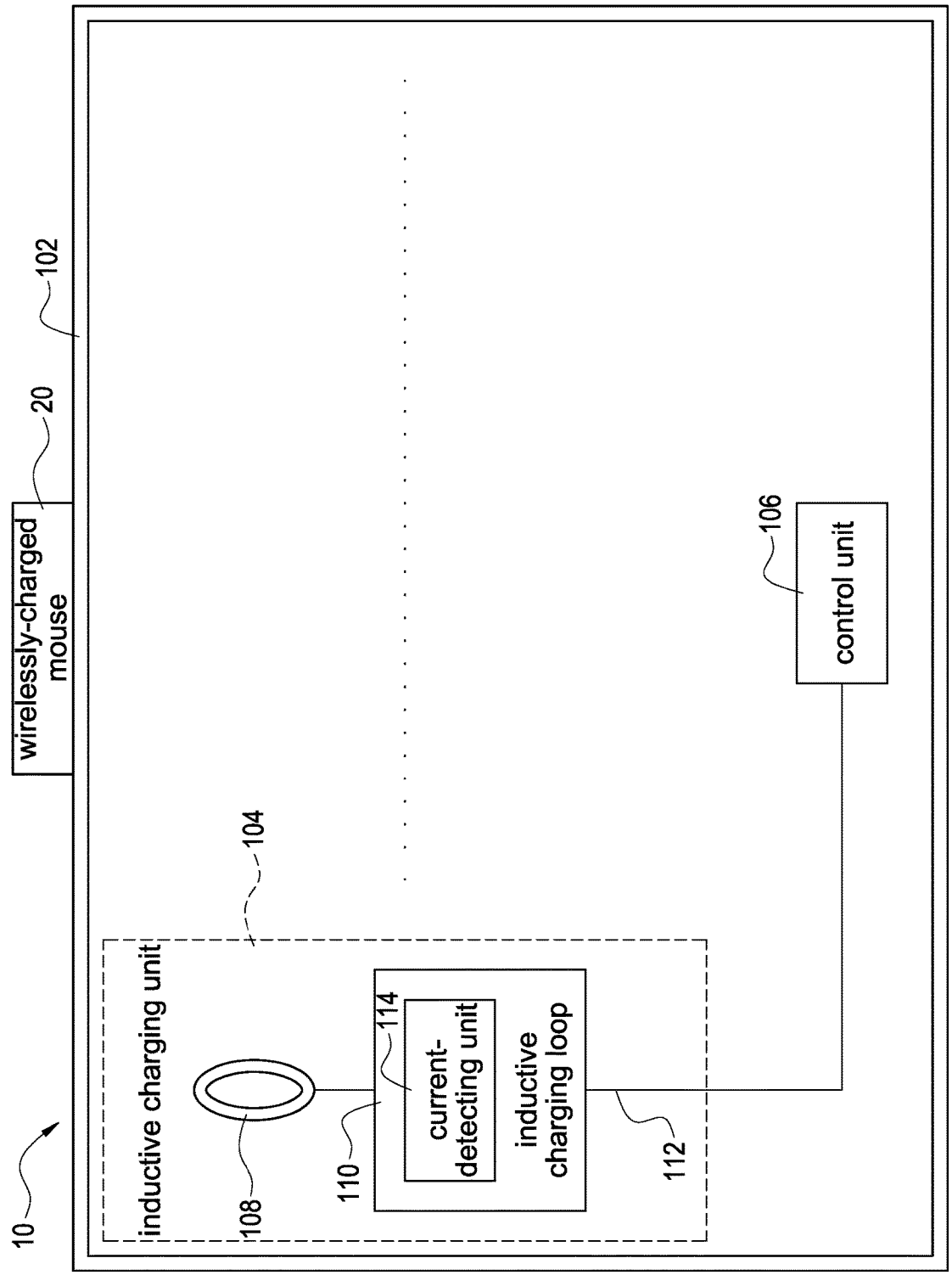
FIG. 3 shows a circuit block diagram of the second embodiment of the intelligent wireless power-supplying mouse pad of the present invention.

FIG. 3 shows a circuit block diagram of the second embodiment of the intelligent wireless power-supplying mouse pad of the present invention. An intelligent wireless power-supplying mouse pad 10 of the present invention is applied to a wirelessly-charged mouse 20. The intelligent wireless power-supplying mouse pad 10 comprises a mouse pad body 102, a plurality of inductive charging units 104 and a control unit 106. Each of the inductive charging units 104 comprises an inductive charging coil 108 and an inductive charging loop 110. The inductive charging loop 110 comprises a current-detecting unit 114. The inductive charging units 104 are arranged in the mouse pad body 102. The control unit 106 is electrically connected to the inductive charging units 104. The control unit 106 is arranged in the mouse pad body 102. The inductive charging loop 110 is electrically connected to the inductive charging coil 108 and the control unit 106. The current-detecting unit 114 is electrically connected to the inductive charging coil 108 and the control unit 106. The wirelessly-charged mouse 20 comprises an induction coil (not shown in FIG. 3), an alternating-current-to-direct-current conversion circuit (not shown in FIG. 3), an electricity storage unit (not shown in FIG. 3), and so on, to achieve wirelessly receiving energy, converting energy and storing energy. The wirelessly-charged mouse 20 is used on the mouse pad body 102 to control a cursor (not shown in FIG. 3) displayed on a monitor (not shown in FIG. 3) of a computer (not shown in FIG. 3) or a notebook computer (not shown in FIG. 3).

When the inductive charging coil 108 and the wirelessly-charged mouse 20 are configured to form an inductive coupling to perform a wireless charging to the wirelessly-charged mouse 20, the inductive charging loop 110 is configured to detect a charging current of the inductive charging coil 108 to obtain a charging status signal 112. The inductive charging loop 110 is configured to send the charging status signal 112 to the control unit 106. Based on the charging status signal 112, the control unit 106 is configured to control a magnitude of an output energy outputted from the inductive charging loop 110 to the inductive charging coil 108 to control an emitting power of the inductive charging coil 108. When the inductive charging coil 108 and the wirelessly-charged mouse 20 are configured to form the inductive coupling to perform the wireless charging to the wirelessly-charged mouse 20, the current-detecting unit 114 of the inductive charging loop 110 is configured to detect the charging current of the inductive charging coil 108 to obtain the charging status signal 112. The other contents of FIG. 3 are similar with the contents of the figures mentioned above so they are not repeated here.

Figure 4:
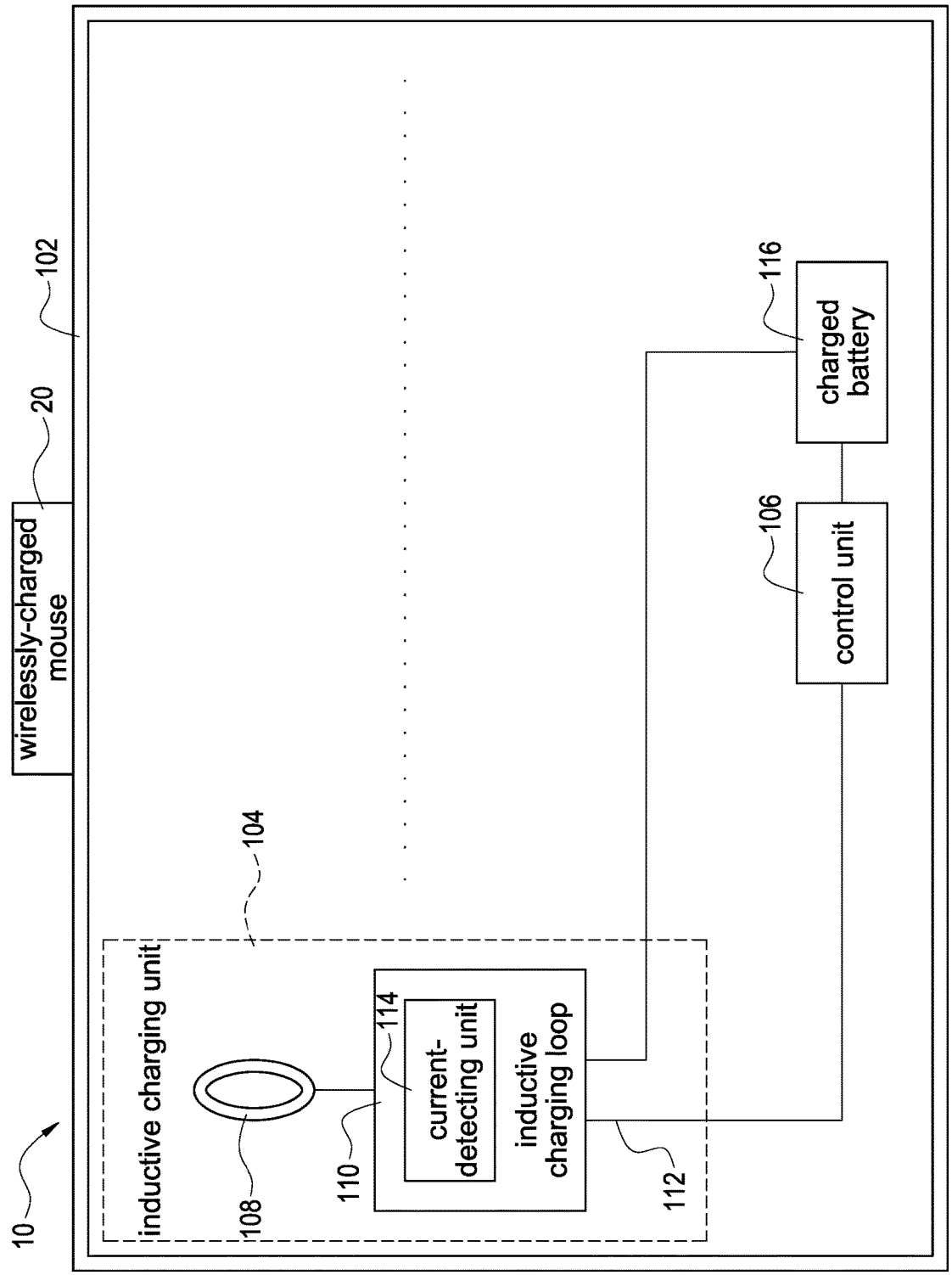
FIG. 4 shows a circuit block diagram of the third embodiment of the intelligent wireless power-supplying mouse pad of the present invention.

FIG. 4 shows a circuit block diagram of the third embodiment of the intelligent wireless power-supplying mouse pad of the present invention. An intelligent wireless power-supplying mouse pad 10 of the present invention is applied to a wirelessly-charged mouse 20. The intelligent wireless power-supplying mouse pad 10 comprises a mouse pad body 102, a plurality of inductive charging units 104, a control unit 106 and a charged battery 116. Each of the inductive charging units 104 comprises an inductive charging coil 108 and an inductive charging loop 110. The inductive charging loop 110 comprises a current-detecting unit 114. The inductive charging units 104 are arranged in the mouse pad body 102. The control unit 106 is electrically connected to the inductive charging units 104. The control unit 106 is arranged in the mouse pad body 102. The inductive charging loop 110 is electrically connected to the inductive charging coil 108 and the control unit 106. The current-detecting unit 114 is electrically connected to the inductive charging coil 108 and the control unit 106. The charged battery 116 is electrically connected to the control unit 106 and the inductive charging units 104. The wirelessly-charged mouse 20 comprises an induction coil (not shown in FIG. 4), an alternating-current-to-direct-current conversion circuit (not shown in FIG. 4), an electricity storage unit (not shown in FIG. 4), and so on, to achieve wirelessly receiving energy, converting energy and storing energy. The wirelessly-charged mouse 20 is used on the mouse pad body 102 to control a cursor (not shown in FIG. 4) displayed on a monitor (not shown in FIG. 4) of a computer (not shown in FIG. 4) or a notebook computer (not shown in FIG. 4).

When the inductive charging coil 108 and the wirelessly-charged mouse 20 are configured to form an inductive coupling to perform a wireless charging to the wirelessly-charged mouse 20, the inductive charging loop 110 is configured to detect a charging current of the inductive charging coil 108 to obtain a charging status signal 112. The inductive charging loop 110 is configured to send the charging status signal 112 to the control unit 106. Based on the charging status signal 112, the control unit 106 is configured to control a magnitude of an output energy outputted from the inductive charging loop 110 to the inductive charging coil 108 to control an emitting power of the inductive charging coil 108. When the inductive charging coil 108 and the wirelessly-charged mouse 20 are configured to form the inductive coupling to perform the wireless charging to the wirelessly-charged mouse 20, the current-detecting unit 114 of the inductive charging loop 110 is configured to detect the charging current of the inductive charging coil 108 to obtain the charging status signal 112. The charged battery 116 is configured to supply power to the control unit 106 and the inductive charging units 104. The other contents of FIG. 4 are similar with the contents of the figures mentioned above so they are not repeated here.

Figure 5:
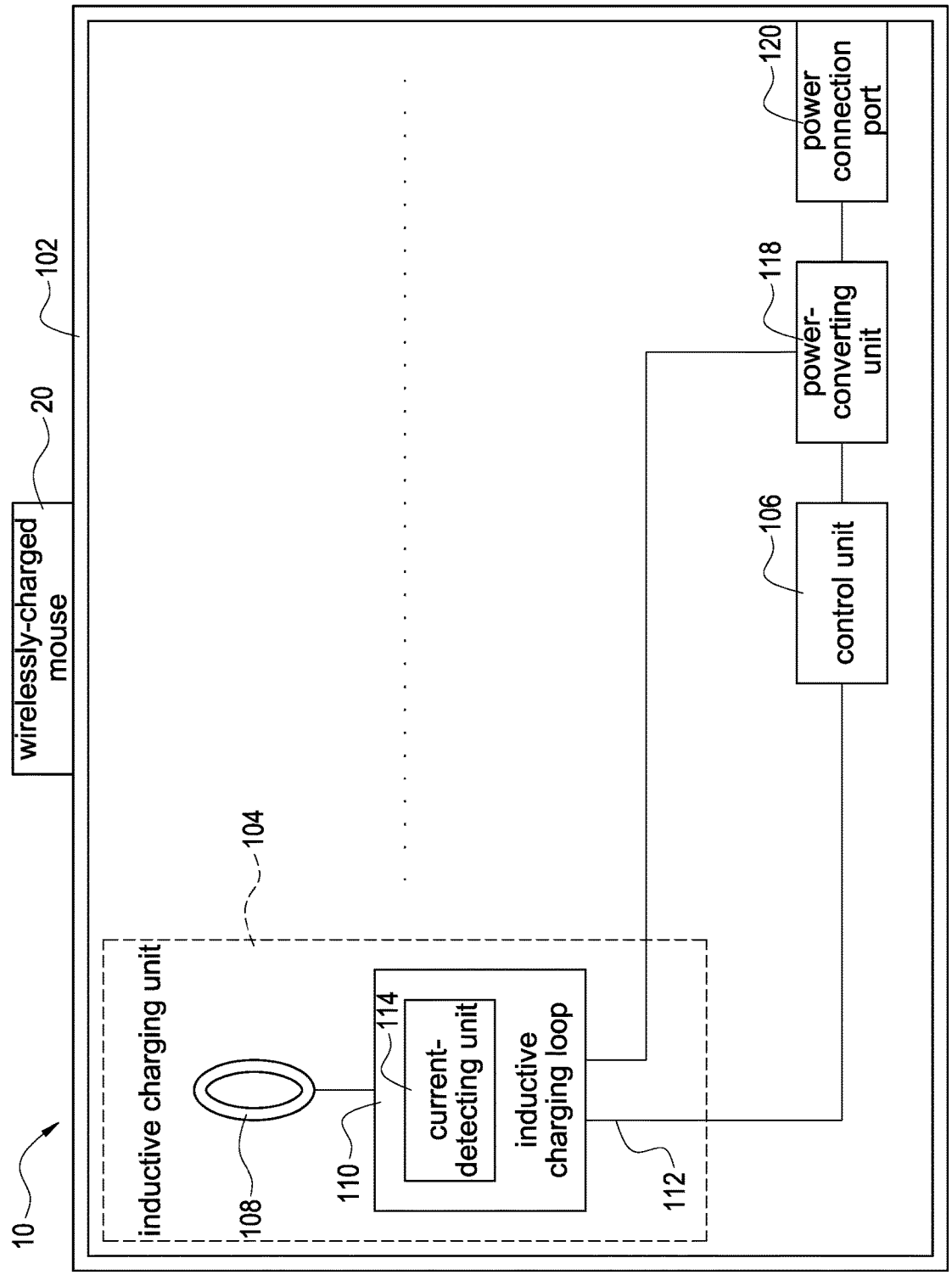
FIG. 5 shows a circuit block diagram of the fourth embodiment of the intelligent wireless power-supplying mouse pad of the present invention.

FIG. 5 shows a circuit block diagram of the fourth embodiment of the intelligent wireless power-supplying mouse pad of the present invention. An intelligent wireless power-supplying mouse pad 10 of the present invention is applied to a wirelessly-charged mouse 20. The intelligent wireless power-supplying mouse pad 10 comprises a mouse pad body 102, a plurality of inductive charging units 104, a control unit 106, a power-converting unit 118 and a power connection port 120. Each of the inductive charging units 104 comprises an inductive charging coil 108 and an inductive charging loop 110. The inductive charging loop 110 comprises a current-detecting unit 114. The inductive charging units 104 are arranged in the mouse pad body 102. The control unit 106 is electrically connected to the inductive charging units 104. The control unit 106 is arranged in the mouse pad body 102. The inductive charging loop 110 is electrically connected to the inductive charging coil 108 and the control unit 106. The current-detecting unit 114 is electrically connected to the inductive charging coil 108 and the control unit 106. The power-converting unit 118 is electrically connected to the control unit 106 and the inductive charging units 104. The power connection port 120 is electrically connected to the power-converting unit 118. The wirelessly-charged mouse 20 comprises an induction coil (not shown in FIG. 5), an alternating-current-to-direct-current conversion circuit (not shown in FIG. 5), an electricity storage unit (not shown in FIG. 5), and so on, to achieve wirelessly receiving energy, converting energy and storing energy. The wirelessly-charged mouse 20 is used on the mouse pad body 102 to control a cursor (not shown in FIG. 5) displayed on a monitor (not shown in FIG. 5) of a computer (not shown in FIG. 5) or a notebook computer (not shown in FIG. 5).

When the inductive charging coil 108 and the wirelessly-charged mouse 20 are configured to form an inductive coupling to perform a wireless charging to the wirelessly-charged mouse 20, the inductive charging loop 110 is configured to detect a charging current of the inductive charging coil 108 to obtain a charging status signal 112. The inductive charging loop 110 is configured to send the charging status signal 112 to the control unit 106. Based on the charging status signal 112, the control unit 106 is configured to control a magnitude of an output energy outputted from the inductive charging loop 110 to the inductive charging coil 108 to control an emitting power of the inductive charging coil 108. When the inductive charging coil 108 and the wirelessly-charged mouse 20 are configured to form the inductive coupling to perform the wireless charging to the wirelessly-charged mouse 20, the current-detecting unit 114 of the inductive charging loop 110 is configured to detect the charging current of the inductive charging coil 108 to obtain the charging status signal 112. The power-converting unit 118 is configured to supply power to the control unit 106 and the inductive charging units 104. The power connection port 120 is connected to the computer or the notebook computer to receive power from the computer or the notebook computer. After the power connection port 120 receives power from the computer or the notebook computer, the power connection port 120 is configured to send power to the power-converting unit 118, so that the power-converting unit 118 is configured to supply power to the control unit 106 and the inductive charging units 104. The other contents of FIG. 5 are similar with the contents of the figures mentioned above so they are not repeated here.

Figure 6:
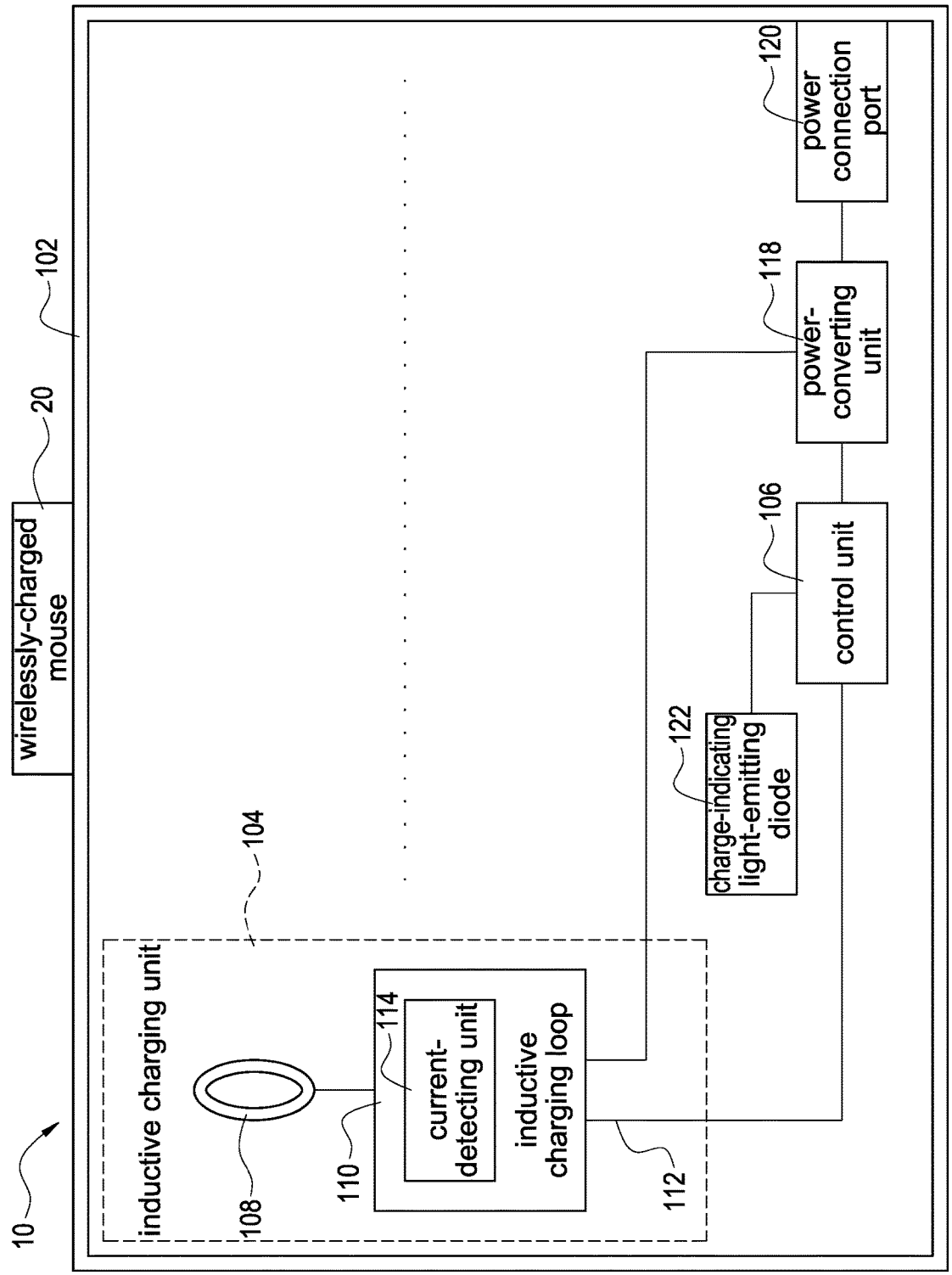
FIG. 6 shows a circuit block diagram of the fifth embodiment of the intelligent wireless power-supplying mouse pad of the present invention.

FIG. 6 shows a circuit block diagram of the fifth embodiment of the intelligent wireless power-supplying mouse pad of the present invention. An intelligent wireless power-supplying mouse pad 10 of the present invention is applied to a wirelessly-charged mouse 20. The intelligent wireless power-supplying mouse pad 10 comprises a mouse pad body 102, a plurality of inductive charging units 104, a control unit 106, a power-converting unit 118, a power connection port 120 and a charge-indicating light-emitting diode 122. Each of the inductive charging units 104 comprises an inductive charging coil 108 and an inductive charging loop 110. The inductive charging loop 110 comprises a current-detecting unit 114. The inductive charging units 104 are arranged in the mouse pad body 102. The control unit 106 is electrically connected to the inductive charging units 104. The control unit 106 is arranged in the mouse pad body 102. The inductive charging loop 110 is electrically connected to the inductive charging coil 108 and the control unit 106. The current-detecting unit 114 is electrically connected to the inductive charging coil 108 and the control unit 106. The power-converting unit 118 is electrically connected to the control unit 106 and the inductive charging units 104. The power connection port 120 is electrically connected to the power-converting unit 118. The charge-indicating light-emitting diode 122 is electrically connected to the control unit 106. The wirelessly-charged mouse 20 comprises an induction coil (not shown in FIG. 6), an alternating-current-to-direct-current conversion circuit (not shown in FIG. 6), an electricity storage unit (not shown in FIG. 6), and so on, to achieve wirelessly receiving energy, converting energy and storing energy. The wirelessly-charged mouse 20 is used on the mouse pad body 102 to control a cursor (not shown in FIG. 6) displayed on a monitor (not shown in FIG. 6) of a computer (not shown in FIG. 6) or a notebook computer (not shown in FIG. 6).

When the inductive charging coil 108 and the wirelessly-charged mouse 20 are configured to form an inductive coupling to perform a wireless charging to the wirelessly-charged mouse 20, the inductive charging loop 110 is configured to detect a charging current of the inductive charging coil 108 to obtain a charging status signal 112. The inductive charging loop 110 is configured to send the charging status signal 112 to the control unit 106. Based on the charging status signal 112, the control unit 106 is configured to control a magnitude of an output energy outputted from the inductive charging loop 110 to the inductive charging coil 108 to control an emitting power of the inductive charging coil 108. When the inductive charging coil 108 and the wirelessly-charged mouse 20 are configured to form the inductive coupling to perform the wireless charging to the wirelessly-charged mouse 20, the current-detecting unit 114 of the inductive charging loop 110 is configured to detect the charging current of the inductive charging coil 108 to obtain the charging status signal 112. The power-converting unit 118 is configured to supply power to the control unit 106 and the inductive charging units 104. The power connection port 120 is connected to the computer or the notebook computer to receive power from the computer or the notebook computer. After the power connection port 120 receives power from the computer or the notebook computer, the power connection port 120 is configured to send power to the power-converting unit 118, so that the power-converting unit 118 is configured to supply power to the control unit 106 and the inductive charging units 104. When the inductive charging coil 108 and the wirelessly-charged mouse 20 are configured to form the inductive coupling to perform the wireless charging to the wirelessly-charged mouse 20, the control unit 106 is configured to drive the charge-indicating light-emitting diode 122 to light based on the charging status signal 112. The other contents of FIG. 6 are similar with the contents of the figures mentioned above so they are not repeated here.

The advantage of the present invention is to save the energy of the wireless power-supplying mouse pad.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An intelligent wireless power-supplying mouse pad applied to a wirelessly-charged mouse, the intelligent wireless power-supplying mouse pad comprising:
   a mouse pad body;
   a plurality of inductive charging units arranged in the mouse pad body; and
   a control unit electrically connected to the inductive charging units and arranged in the mouse pad body,
   wherein each of the inductive charging units comprises:
      an inductive charging coil; and
      an inductive charging loop electrically connected to the inductive charging coil and the control unit,
   wherein when the inductive charging coil and the wirelessly-charged mouse are configured to form an inductive coupling to perform a wireless charging to the wirelessly-charged mouse, the inductive charging loop is configured to detect a charging current of the inductive charging coil to obtain a charging status signal; the inductive charging loop is configured to send the charging status signal to the control unit; based on the charging status signal, the control unit is configured to control a magnitude of an output energy outputted from the inductive charging loop to the inductive charging coil to control an emitting power of the inductive charging coil;
   wherein when the control unit is configured to determine that the charging status signals obtained by detecting the charging currents of a first quantity of the inductive charging coils of the inductive charging units are less than a charging predetermined value respectively, the control unit is configured to correspondingly control the magnitudes of the output energies outputted from the inductive charging loops to the first quantity of the inductive charging coils of the inductive charging units as a first energy value respectively;
   wherein when the control unit is configured to determine that the charging status signals obtained by detecting the charging currents of a second quantity of the inductive charging coils of the inductive charging units are greater than or equal to the charging predetermined value respectively, the control unit is configured to correspondingly control the magnitudes of the output energies outputted from the inductive charging loops to the second quantity of the inductive charging coils of the inductive charging units as a second energy value respectively;

wherein the first quantity is greater than zero; the second quantity is greater than zero; the first quantity and the second quantity area total quantity of the inductive charging units; the second energy value is greater than the first energy value; the first energy value is greater than or equal to zero.

2. The intelligent wireless power-supplying mouse pad in claim 1, wherein the inductive charging loop comprises:

a current-detecting unit electrically connected to the inductive charging coil and the control unit, wherein when the inductive charging coil and the wirelessly-charged mouse are configured to form the inductive coupling to perform the wireless charging to the wirelessly-charged mouse, the current-detecting unit of the inductive charging loop is configured to detect the charging current of the inductive charging coil to obtain the charging status signal.

3. The intelligent wireless power-supplying mouse pad in claim 2 further comprising:

a charged battery electrically connected to the control unit and the inductive charging units, wherein the charged battery is configured to supply power to the control unit and the inductive charging units.

4. The intelligent wireless power-supplying mouse pad in claim 2 further comprising:

a power-converting unit electrically connected to the control unit and the inductive charging units; and a power connection port electrically connected to the power-converting unit, wherein the power-converting unit is configured to supply power to the control unit and the inductive charging units.

5. The intelligent wireless power-supplying mouse pad in claim 4 further comprising:

a charge-indicating light-emitting diode electrically connected to the control unit, wherein when the inductive charging coil and the wirelessly-charged mouse are configured to form the inductive coupling to perform the wireless charging to the wirelessly-charged mouse, the control unit is configured to drive the charge-indicating light-emitting diode to light based on the charging status signal.

\* \* \* \* \*